United States Patent [19]

Otani et al.

[11] 4,387,565

[45] Jun. 14, 1983

[54] EXHAUST GAS CLEANING SYSTEM FOR MULTI-CYLINDER INTERNAL COMBUSTION ENGINE

[75] Inventors: Junji Otani, Oomiya; Yasuo Ikenoya, Kawagoe, both of Japan

[73] Assignee: Honda Giken Kogyo Kabushiki Kaisha, Tokyo, Japan

[21] Appl. No.: 244,828

[22] Filed: Mar. 17, 1981

[30] Foreign Application Priority Data

Mar. 24, 1980 [JP] Japan .............................. 55-38352[U]

[51] Int. Cl.³ .............................................. F01N 3/22
[52] U.S. Cl. ...................................... 60/293; 60/305; 180/219
[58] Field of Search ...................... 60/293, 304, 305; 180/219

[56] References Cited

U.S. PATENT DOCUMENTS

| | | | |
|---|---|---|---|
| 3,869,859 | 3/1975 | Thornburgh | 60/305 |
| 4,083,184 | 4/1978 | Ushijima | 60/293 |
| 4,154,058 | 5/1979 | Mase | 60/293 |
| 4,280,582 | 7/1981 | Kouyama | 180/219 |

FOREIGN PATENT DOCUMENTS

55-32947 3/1980 Japan ............................... 60/293

*Primary Examiner*—Douglas Hart
*Attorney, Agent, or Firm*—Posnack, Roberts, Cohen & Spiecens

[57] ABSTRACT

A motorcycle comprising a frame on which are mounted a fuel tank, a seat, front and rear wheels, and a multi-cylinder internal combustion engine disposed in a space defined by the fuel tank, seat and wheels. The engine has a plurality of exhaust ports open at the front of the engine connected to an exhaust system. An exhaust gas cleaning system is provided for the multi-cylinder internal combustion engine and comprises a reed valve assembly on the engine operating in response to pulsating exhaust pressure in the engine for selectively connecting an upstream secondary air passage connected to an inlet port of the reed valve assembly and a plurality of downstream secondary air passages of substantially equal length connected between outlet ports of the reed valve assembly and corresponding exhaust ports of the engine.

19 Claims, 11 Drawing Figures

EXHAUST GAS CLEANING SYSTEM FOR MULTI-CYLINDER INTERNAL COMBUSTION ENGINE

BACKGROUND OF THE INVENTION

1. Field of the Invention

The present invention relates to an exhaust gas cleaning system for a multi-cylinder internal combustion engine, particularly for motorcycles, adapted to supply the exhaust system of the internal combustion engine with secondary air to promote oxidation of unburnt noxious components in the exhaust gas flowing through the exhaust system.

2. Description of the Prior Art

An exhaust gas cleaning system of the above type is known comprising a secondary air supplying system connected to the exhaust system of an internal combustion engine, the secondary air supplying system being equipped at an intermediate portion with a reed valve device adapted to be opened and closed by the pulsating exhaust gas pressure to introduce the secondary air into the exhaust system for cleaning the exhaust gas.

The above-mentioned reed valve device can operate without requiring any specific driving means and has the advantageous features of simplified construction and low cost of production. This device, however, poses the problem that the amount of secondary air introduced therethrough tends to be insufficient, particularly in the case where the engine has a multiplicity of cylinders. In addition, this device cannot perform uniform secondary air distribution to all cylinders of the multi-cylinder engine.

It is, therefore, necessary to provide suitable countermeasures for overcoming these problems.

In the case where the multi-cylinder engine is mounted on a motorcycle, the engine and, accordingly, the exhaust gas cleaning system are exposed to the ambient air. It is desirable that the exhaust gas cleaning device be mounted in such a manner as to have minimum projection to the outside and be in close proximity to the existing equipment so as to minimize damage by external forces while not interfering with the attachment and maintenance of the existing equipment.

In the known exhaust gas cleaning device of the type mentioned above, the passage interconnecting the reed valve device and the exhaust system, i.e. the passage downstream from the reed valve device, acts not only as a passage for introducing the secondary air into the exhaust system but also as a passage for transmitting the pulsating exhaust pressure to the reed valve device to actuate the latter. Therefore, during the operation of the reed valve device, exhaust gas of high temperature is allowed to flow back momentarily into the above-mentioned passage to reach the reed valve device to heat the passage and the reed valve device. It is, therefore, necessary to take suitable measures for cooling the passage and the reed valve device.

In addition, when the reed valve device is mounted directly on the engine, the reed valve device is liable to be affected adversely by the heat generated in the engine to diminish its durability.

Furthermore, there is a problem of unfavorable noise generated by the reed valve device when it opens and closes repeatedly.

SUMMARY OF THE INVENTION

Accordingly, an object of the invention is to provide a simple exhaust gas cleaning device for multi-cylinder internal combustion engines, which can supply sufficiently large amounts of secondary air from the reed valve device uniformly to a plurality of exhaust ports of a multi-cylinder engine, and which can be mounted on the engine in such a manner as to avoid damage by external forces.

Another object of the invention is to provide a simple exhaust gas cleaning system for multi-cylinder internal combustion engines for motorcycles, which can effectively cool the secondary air supplying system, particularly the portion of the system downstream of the reed valve, by making an efficient use of the air flow which is naturally generated as the motorcycle travels, and which can be mounted in such a manner as to avoid damage by external forces.

Still another object of the invention is to provide an exhaust gas cleaning system for multi-cylinder internal combustion engines, in which the secondary air passage for supplying the secondary air to the exhaust ports is formed integrally with a plurality of existing members with a tight and heat-resistive seal at the juncture between the wall of the passage and the existing members to prevent leakage of secondary air, the exhaust gas cleaning system thus being easy to assemble.

A further object of the invention is to provide an exhaust gas cleaning system, in which the pulsating exhaust pressure is transmitted without substantial attenuation to ensure the reliable operation of the reed valve and in which the adjustment of the flow rate of secondary air supplied to the exhaust system can be easily made.

A still further object of the invention is to provide an exhaust gas cleaning system in which the reed valve device is arranged to avoid deterioration due to the heat generated by the engine and in which the noise generated by the reed valve is suppressed to ensure a "quiet" operation of the exhaust gas cleaning system.

Other objects of the invention include achieving various requirements, such as easy mounting of the reed valve device when the latter is used for internal combustion engines for motorcycles, not hindering the maintenance of the internal combustion engine by the mounting of the reed valve device, no restrictions on the lay-out and attachment of other equipment, effective cooling of the reed valve device to improve its durability, protecting the reed valve device from contact with other equipment or apparatus, and preservation of the attractive appearance of the motorcycle as a whole.

DESCRIPTION OF THE PREFERRED EMBODIMENTS

Hereinafter, the invention will be described in relation to preferred forms applied to an internal combustion engine of a motorcycle, with reference to the accompanying drawings.

Figure 1:
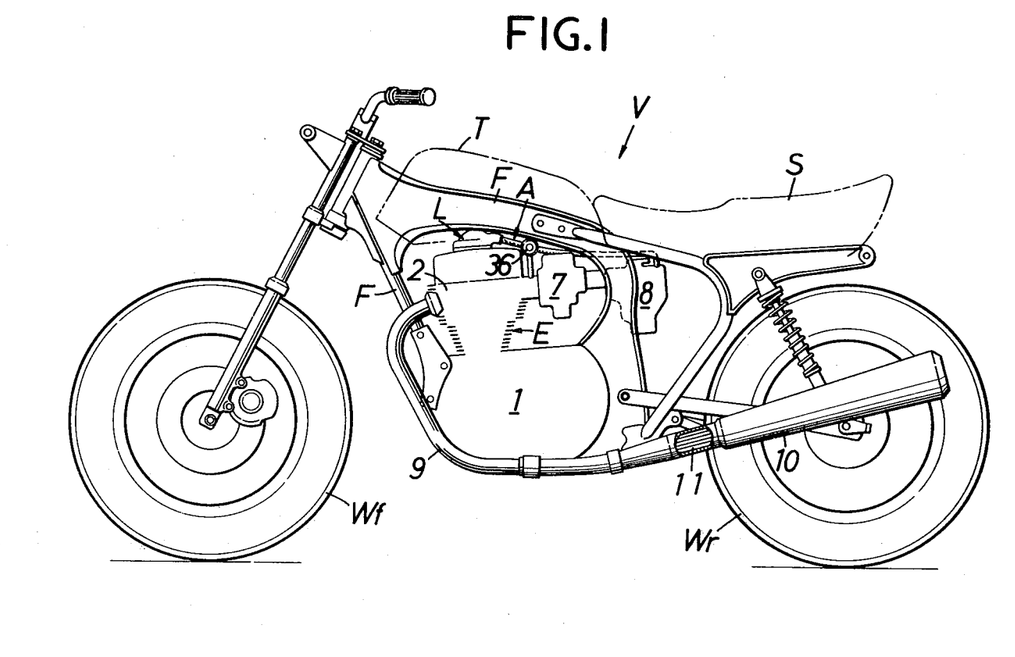
FIG. 1 is a side elevational view of a motorcycle equipped with an exhaust gas cleaning system for a multi-cylinder internal combustion engine, in accordance with a first embodiment of the invention.

Referring first to FIG. 1, therein is seen a fuel tank T and a seat S mounted on the frame F of a motorcycle V. A front wheel Wf and a rear wheel Wr are suspended at the front and rear of the frame F. An internal combustion engine E having two cylinders is mounted in the space defined between the tank T, seat S and wheels Wf,Wr, in such a manner that the crank shaft of the engine extends at right angles to the longitudinal axis of the frame F.

Figure 2:
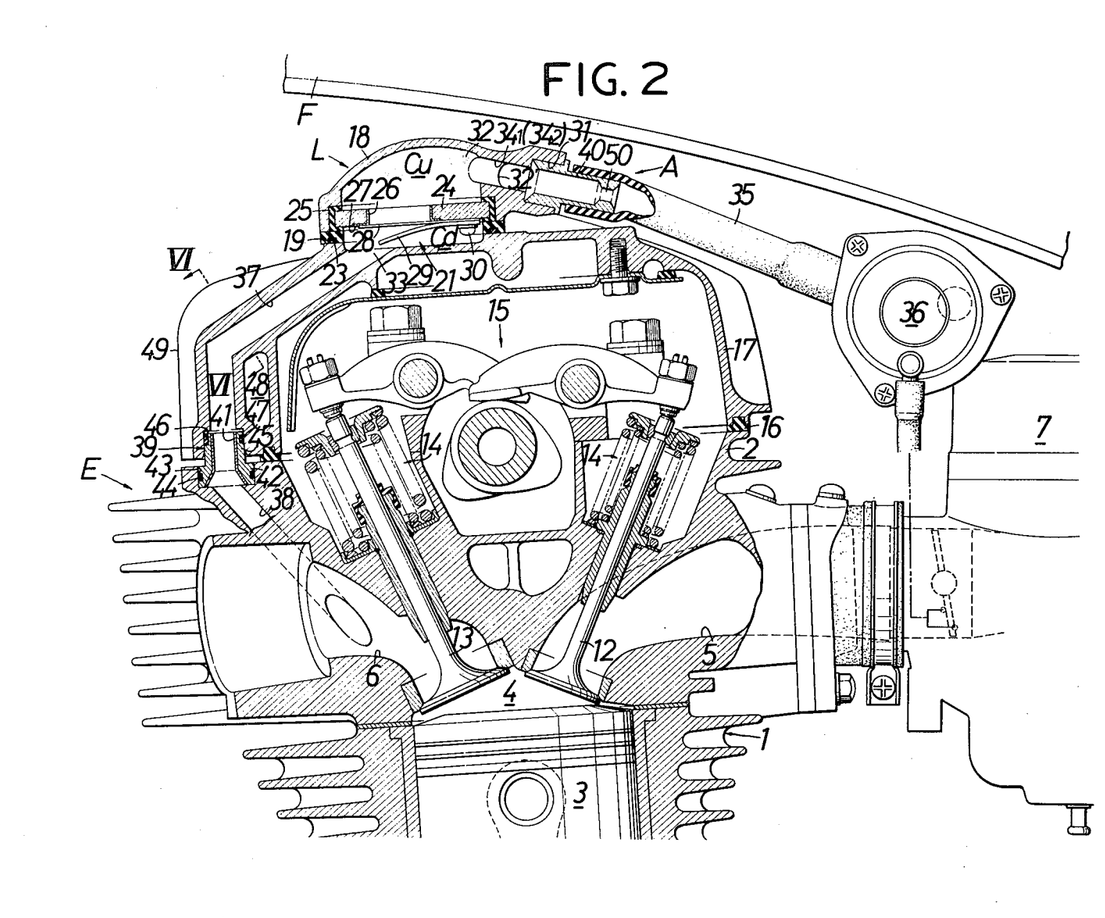
FIG. 2 is an enlarged longitudinal sectional view of the head portion of the internal combustion engine of the motorcycle shown in FIG. 1.
Figure 3:
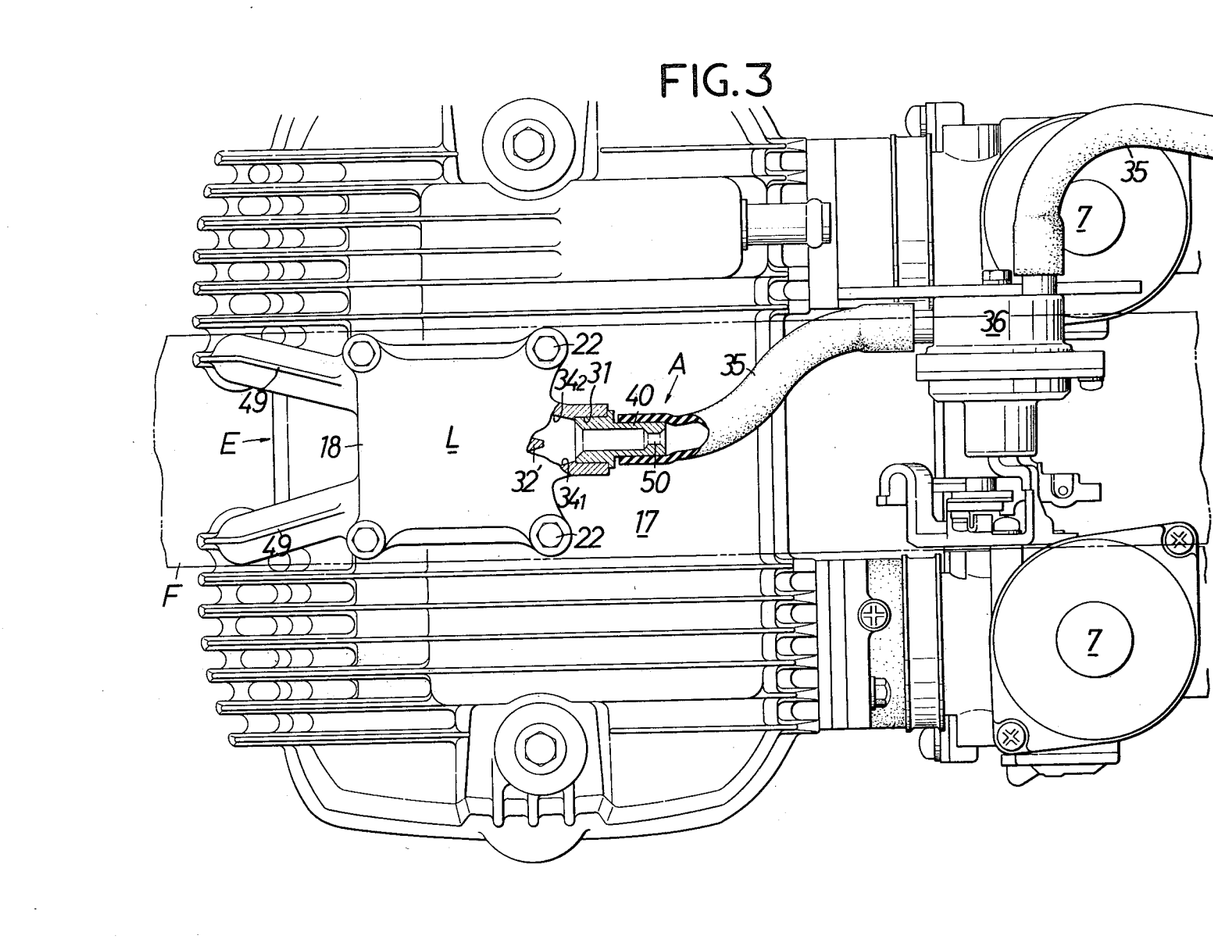
FIG. 3 is a partly sectioned plan view of the portion shown in FIG. 2.

Referring now to FIG. 2, the engine comprises a body 1 which has a cylinder head 2 in the rear portion of which are two intake ports 5 communicating with a combustion chamber 4 above a piston 3, whereas, in the front portion of the cylinder head 2, two exhaust ports 6 are formed so as to communicate with the combustion chamber 4. Thus, the intake ports 5 and exhaust ports 6 are arranged in a manner referred to as "cross-flow." Each intake port 5 opens at the rear of the engine body 1, while each exhaust port 6 opens at the front of the engine body.

An intake system including a carburetor 7 and an air cleaner 8 is arranged behind the engine body 1 and is connected to the intake ports 5, while an exhaust system including an exhaust pipe 9 and a muffler 10 is connected to the exhaust ports 6. A catalytic converter 11 for cleaning the exhaust gas is disposed in an intermediate portion of the muffler 10.

Additionally, the cylinder head 2 is provided with intake and exhaust valves 12,13 which are adapted to open and close the open ends of the intake and exhaust ports 5,6 facing the combustion chamber 4, as is well known. The valves 12,13 are actuated to open and close the respective ports by cooperation with valve springs 14 and valve actuating mechanism 15.

A head cover 17 is attached to the upper part of the cylinder head 2 with a seal 16 interposed therebetween.

Connected between the exhaust ports 6 and the air cleaning chamber of the air cleaner 8 is a secondary air supply system A extending longitudinally substantially at the center of of the cover 17. A reed valve device L adapted to operate in response to the pulsating exhaust pressure and an air control valve 36 are provided at an intermediate portion of the system A.

The reed valve device L is centrally mounted, widthwise, on the head cover 17. The frame F of the motorcycle extends just above the reed valve L and the air control valve 36 to protect the same.

The construction of the reed valve device L will be described more fully. The reed valve device L has a valve housing 18 which is open at its lower end. An annular-shaped insulator 19 made of phenol resin, acrylic resin or similar heat-resistant and shock-absorbing material is connected beforehand to the lower opening of the valve housing 18 in such a manner as not to be separable therefrom.

Figures 4, 6, 8:
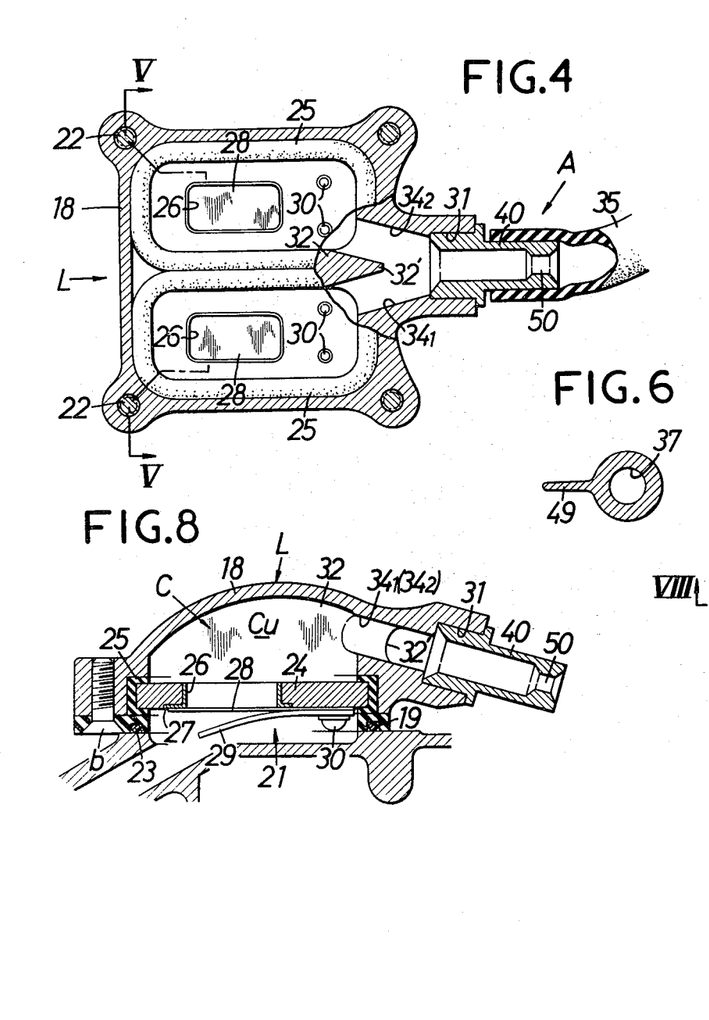
FIG. 4 is a plan view, partly in section, of a reed valve device.
FIG. 6 is a sectional view taken along line VI—VI in FIG. 2.
FIG. 8 is a sectional view taken along line VIII—VIII in FIG. 7.
Figure 5:
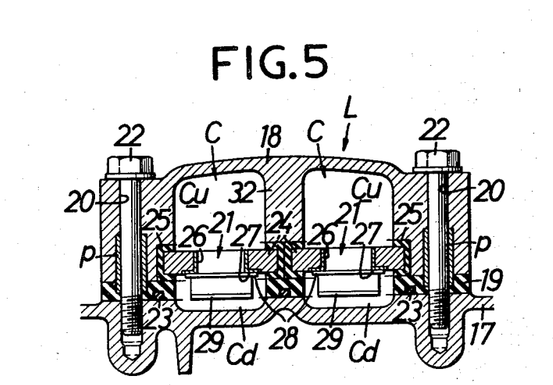
FIG. 5 is a sectional view taken along line V—V in FIG. 4.
Figure 7:
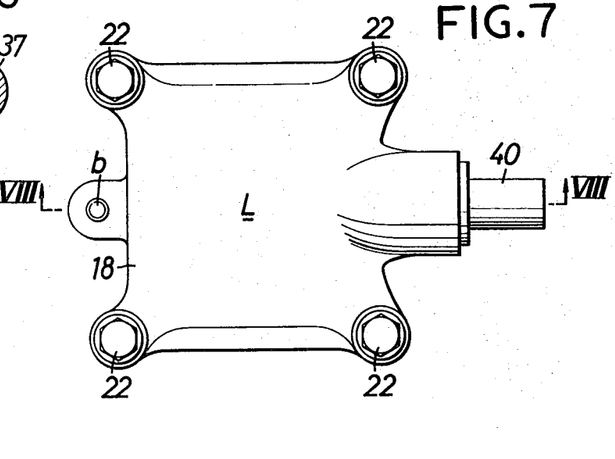
FIG. 7 is a plan view of a modification of the reed valve device.

More specifically, as seen in FIG. 5, a knock pin p is fitted to extend in bolt hole 20 formed in the valve housing 18 and the insulator 19. Alternatively, the insulator 19 can be attached to the valve housing 18 by means of small screws b as shown in FIG. 8.

The valve housing 18 thus coupled with the insulator 19 is mounted on the head cover 17 of the engine body 1 with the insulator 19 interposed therebetween, and is fixed thereto by means of a plurality of bolts 22, so as to define a reed valve chamber C. An "O" ring 23 is fixed between the insulator 19 and the head cover 17 to form a seal therebetween.

Left and right reed valves 21 forming a pair are interposed between the valve housing 18 and the insulator 19, and are clamped therebetween through the intermediary of a heat-resisting elastic packing member 25 having a U-shaped cross-section.

Left and right upstream chambers Cu are defined above respective reed valves 21. Similarly, left and right downstream chambers Cd are formed below respective reed valves 21. Each reed valve 21 comprises a valve seat 24 in which a valve port 26 is formed as shown in FIG. 4 such that each upstream chamber Cu communicates with an associated downstream chamber Cd through the valve port 26. A reed seat surface 27 is formed on the lower face of each valve seat 24 facing the downstream chamber Cd. A reed 28 for opening and closing each valve port 26 is placed in contact with the reed seat surface 27. The opening stroke of the reed 28 is limited by a reed stopper 29 underlying the reed 28. The reed 28 and the reed stopper 29 are secured at their base ends to the valve seat 24 by means of bolts 30.

An inlet port 31 is formed in valve housing 18 and communicates with the upstream chambers Cu. The free end 32' of a partition wall 32 separating the upstream chambers Cu gradually tapers and extends towards the inlet port 31. The tapered end 32' of the partition wall 32 and the side walls of the valve housing 18 cooperate to define branch passages $34_1$, $34_2$ through which the inlet port 31 is in communication with both upstream chambers Cu.

Secondary air from the inlet port 31 is divided into two substantially equal parts which are directed toward respective upstream chambers Cu through the branching passages $34_1$, $34_2$. An upstream secondary air passage 35 is detachably connected to the inlet port 31 through a connecting pipe 40 provided with an orifice 50. The secondary air passage 35 is connected to the air cleaning chamber of the air cleaner 8 through an air control valve 36. The air control valve is a conventional valve which is normally closed and is opened in response to intake vacuum in the intake system as the internal combustion engine E operates.

Two first downstream secondary air passages 37 (FIG. 2) are formed along the front face of the head cover 17 integrally with the latter. The passages 37 have substantially equal lengths and extend toward the exhaust ports 6. The first downstream secondary air passages 37 are connected at their upper ends to the outlet ports 33 of the downstream chambers Cd and at their lower ends to the lower face of the head cover 17.

Second downstream secondary air passages 38 leading to the exhaust ports 6 are formed in the cylinder head 2 and open at the upper face of the cylinder head. The secondary air passages 38 are connected to the first downstream secondary air passages 37 through connecting members 39 which will be described later. The first and the second downstream secondary air passages 37,38 have substantially equal diameters. Therefore, as the engine operates, the pulsating exhaust pressure in the the exhaust ports 6 produces a force to open the reed valves 21 to permit the secondary air to be induced from the upstream chambers Cu to the exhaust ports 6 via the downstream secondary air passages 37, 38.

Each connecting member 39 has a stepped cylindrical main body made of a material having a low heat conductivity such as phenol resin and is lined at its inner peripheral surface with a heat-resistant metal foil or plate 41. However, the main body may be made from iron and coated with a heat-resistant and acid-proof film 41 such as a Ducro film. A conical base portion 42 of the connecting member 39 is fitted in airtight manner through an "O" ring seal 44 in a corresponding recess 43 formed in the upper face of the cylinder head 2 at the open end of the second downstream secondary air passage 38. The connecting member 39 has an end 45 of smaller diameter projecting upwardly from the cylinder head 2. The base end 42 may be press-fitted, bonded or fixed by any other suitable means in the recess 43.

The head cover 17 is provided with insertion holes 46 communicating with the first downstream secondary air passages 37 in correspondence with the smaller diameter ends 45 of the connecting members 39. In mounting the head cover 17 on the cylinder head 2, the smaller diameter ends 45 of the connecting members are fitted in the insertion holes 46 through the intermediary of "O" rings 47 so that the first downstream secondary air passages 37 are connected to corresponding second downstream secondary air passages 38 in airtight manner through connecting members 39. Thus, the upstream secondary air passage 35 and the downstream secondary air passages 37,38 in combination constitute a secondary air supply passage in the system of the invention. The connecting members 39 also function as guides in the mounting of the head cover 17 on the cylinder head 2, as well as locating members for locating the cylinder head 17 correctly in relation to the cylinder head 2.

A recess 48 is formed in the head cover 17 at the back side of each secondary air passage 37 to partially encircle the secondary air passage 37, the recess communicating with the atmosphere. As will be understood from FIG. 6, cooling fins 49 uniformly project from the front side of the outer peripheral wall of the secondary air passages 37 to promote the cooling of the secondary air passage 37.

The first embodiment of the invention having the construction heretofore described operates in the following manner.

As the internal combustion engine operates, a pulsating exhaust pressure is generated in the exhaust ports 6. This pulsating exhaust pressure reaches the pair of reed valves 21 through the downstream secondary air passages 38,37 to open the reed valves 21. Then, as the air control valve 36 is opened as a result of the engine operation, a portion of the cleaned air in the air cleaning chamber of the air cleaner 8 is introduced into the upstream chambers Cu of the valve housing 18 through the upstream secondary air passage 35 and then flows into the downstream chambers Cd through the valve ports 26 of respective reed valves 21 to reach respective exhaust ports 6 via the downstream secondary air passages 37,38.

The orifice 50 in the connecting pipe 40 between the inlet port 31 of the valve housing 18 and the upstream secondary air passage 35 serves to adjust the flow rate of the air at the upstream side of the reed valve device L. In addition, the downstream secondary passages 37,38 have substantially constant diameters over their entire lengths. Therefore, the secondary air flows substantially at a constant flow rate at the downstream side of the reed valve device L so as to minimize attenuation of the pulsating exhaust pressure thereby to ensure a reliable operation of the reed valves 21.

The reed valves 21 contact the reed seat surfaces 27 each time they are opened and closed in response to the pulsating exhaust pressure. The noise, however, is absorbed and eliminated by the resilient shock-absorbing body 25.

The secondary air introduced into each exhaust port 6 is mixed with the exhaust gas to oxidize unburnt noxious components such as HC,CO and so forth contained in the exhaust gas in the exhaust pipe 9. The exhaust gas now mixed with secondary air is introduced into the muffler 10 accommodating the catalytic converter 11 so that the reaction in the catalytic converter is promoted by the presence of the secondary air to finally remove the noxious components before the exhaust gas is discharged to the atmosphere.

The reed valve device L is disposed substantially centrally, widthwise, on the upper face of the head cover 17, and the outlet ports 33 of the left and right downstream chambers Cd under the reed valve device L are in communication with the two exhaust ports 6 of the cylinder head 2 through the two lines of downstream secondary air passages 37, 38 of the same length. This arrangement permits an even or uniform distribution of the secondary air to the exhaust systems of all cylinders, so that the exhaust gas flowing through respective exhaust systems is uniformly cleaned without substantial waste. Also, this arrangement permits the reed valve device L which serves for supplying secondary air to a plurality of exhaust systems to be constructed as a unit.

Each reed valve 21 is opened and closed in response to the positive and negative pressures generated by the pulsation of the exhaust pressure in the associated exhaust port. Momentarily, the exhaust gas in the exhaust port 6 is allowed to flow back through the downstream secondary air passages 38,37 to reach the reed valve 21. Accordingly, the downstream secondary air passages 37,38 and the reed valve device L are heated by the heat of the exhaust gas which could lead to deterioration of the constituents of the reed valve device L, particularly the elastic packing material 25 which is less resistive to heat, resulting in an operation failure of the reed valve 21, as well as shortened life of the reed valve device L. According to the invention, however, temperature increase in the downstream secondary air passages is suppressed because these passages are positioned along the front surface of the head cover 17, the recesses 48 extend over a portion of the periphery of the air passages 37,38 and the cooling fins 49 project forwardly to permit the secondary air passages to be effectively cooled by the flow of air generated naturally as the motorcycle travels.

The engine body 1 is heated to a high temperature as the engine E operates, and this temperature would normally be transmitted to the reed valves 21 of the reed valve device L attached to the head cover 17. In consequence, deterioration of the constitutents of the reed valve device L, particularly the packing member 25, would be promoted and, accordingly, undesirable noise would be generated as the reeds 28 hit the associated seat surfaces. According to the invention, however, temperature increase of the reed valves 21 is suppressed by the insulator 19 which effectively insulates the reed valves from the heat from the engine body 1, so that degradation of the packing material 25 is effectively avoided.

A slight distortion of the insulator 19 may be produced when the engine is heated to an extremely high temperature. Therefore, when the air control valve 36 is temporarily closed during deceleration to prevent afterburning, the pressure around the reed valves 21 is drastically lowered. If a slight gap should be formed between the head cover 17 and the insulator 19 due to the distortion of the latter, ambient air may be induced through this gap to cause an after-burning in the exhaust passage. This problem, however, is avoided in the invention because the "O" ring 23 interposed between the insulator and the head cover effectively absorbs any distortion of the insulator 19.

As stated before, since the reed valves 21 are adapted to be opened and closed in response to the pulsating exhaust pressure in the associated exhaust ports 6, exhaust gas of high temperature is allowed to flow back through the downstream secondary air passages 38,37, although momentarily, to reach the reed valves 21.

This permits the hot exhaust gas to flow through the connecting members 39 which are made of a material having low heat conductivity such as phenol resin. This material, however, is not directly exposed to the gas because the internal peripheral surface of the member 39 is lined with the heat-resisting metallic plate or metal foil 41, so that the degradation of the material due to the heat is suppressed to preserve the function of the connecting member 39 over a long period to prevent leakage of the secondary air to the outside. In addition, the metallic plate or foil 41 lining the inner surface of the connecting member contributes to the reduction of flow resistance encountered by the secondary air flowing therethrough.

In the embodiment described hereinbefore, the large diameter base end 42 of the connecting member 39 is fitted into the open end of the second downstream secondary air passage 38 closer to the cylinder head 2, while the smaller diameter end 45 is fitted into the open end of the first downstream secondary air passage 37 closer to the head cover 17. This, however, is not mandatory and it is possible to provide a reversed construction in which the large diameter base portion 42 and the smaller diameter end 45 of the connecting member 39 are respectively fitted in the first and second downstream secondary air passages 37 and 38, respectively.

Since the reed valve device L is usually mounted in the restricted space above the engine body 1, it is desirable to construct the reed valve device L for easy mounting. According to the invention, the assembling and mounting of the reed valve device L on the engine body 1 is very much facilitated because, as stated before, the insulator 19 is beforehand attached to the valve housing 18 by means of knock pin p or small screw b, in advance of the mounting of the valve housing 18 on the engine body 1.

Figure 9:
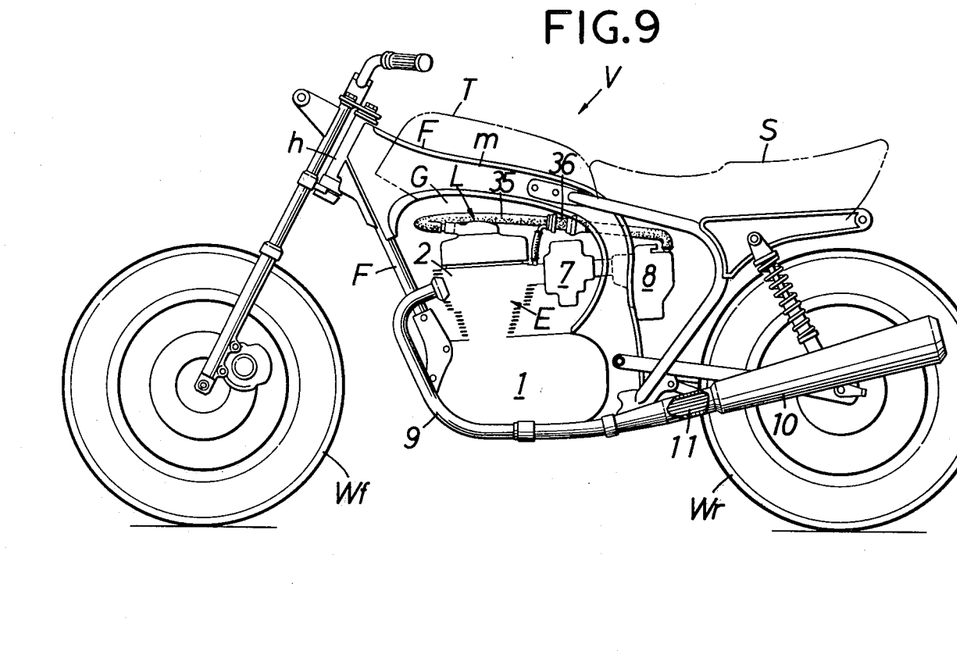
FIG. 9 is a side elevational view of a motorcycle equipped with an exhaust gas cleaning system constructed in accordance with a second embodiment of the invention.
Figure 10:
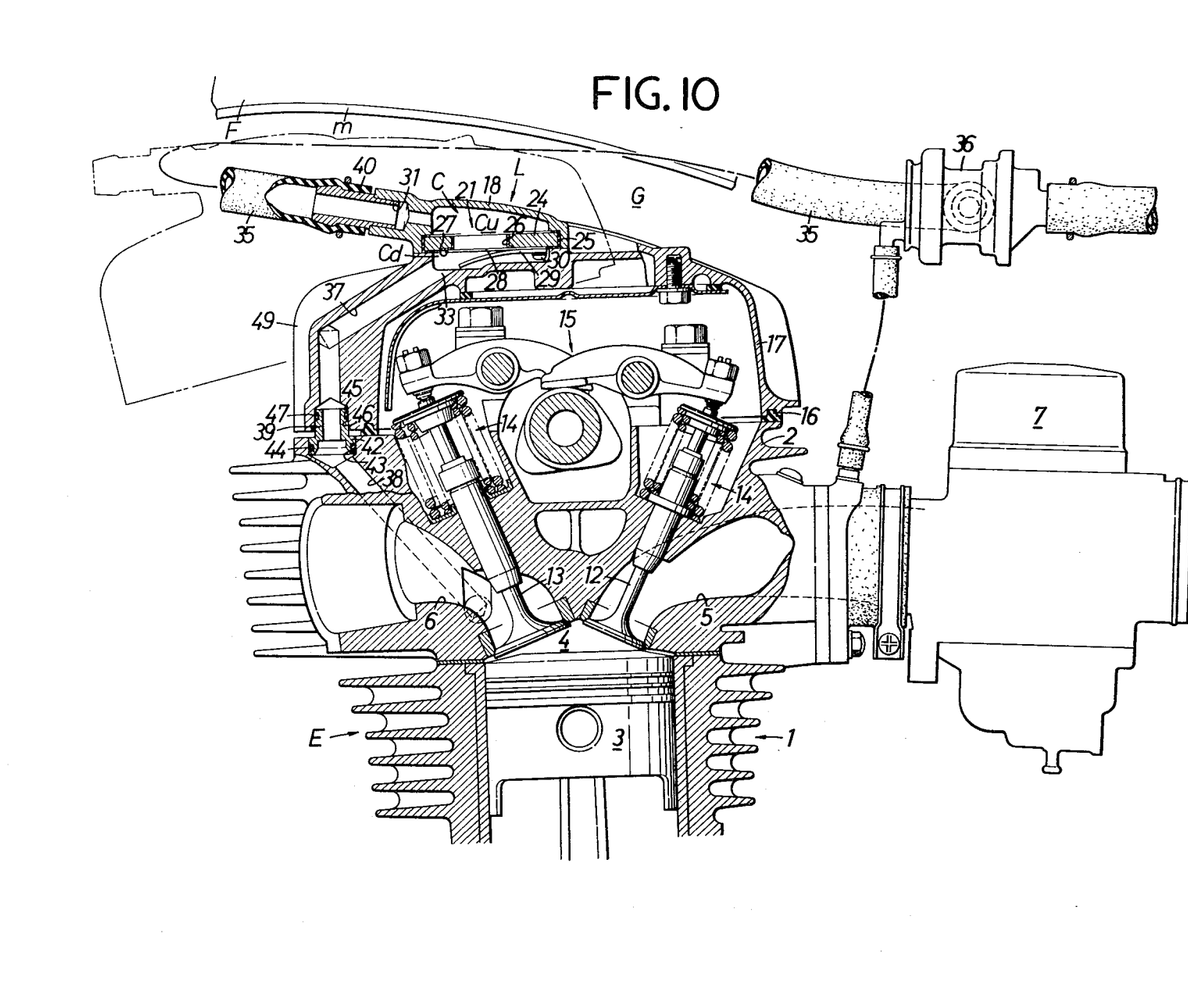
FIG. 10 is an enlarged longitudinal sectional view of the head portion of the internal combustion engine of the motorcycle shown in FIG. 9.
Figure 11:
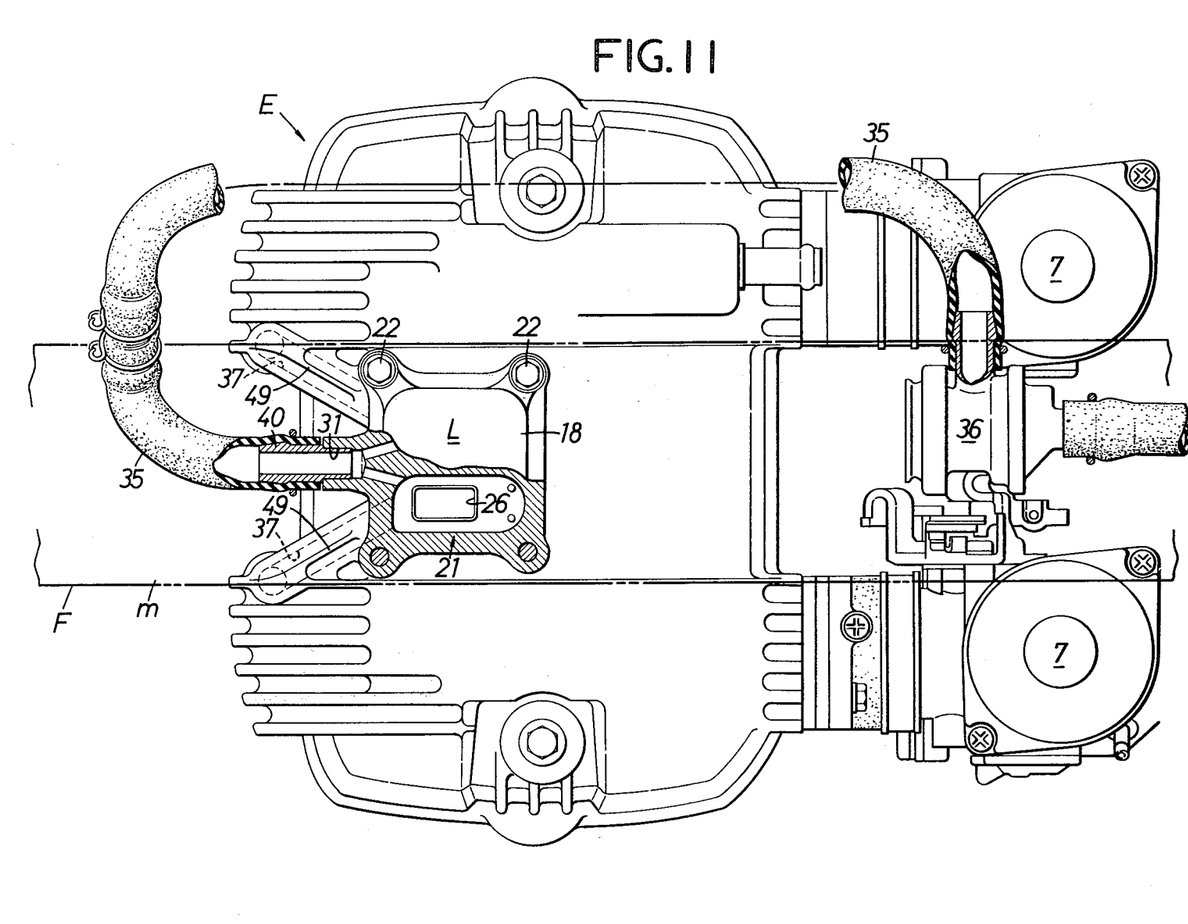
FIG. 11 is a partly sectioned plan view of the portion shown in FIG. 10.

FIGS. 9 to 11 show a second embodiment of the invention.

In this embodiment, an internal combustion engine E as a driving power source is suspended from the central part of a chassis frame F of a motorcycle V. A main frame m projecting rearwardly from the head pipe h of the frame F extends just above the internal combustion engine E, and the fuel tank T and the seat S are carried by the main frame m.

The upper end of the engine E has a convex profile constituted by the upper face of the cylinder head cover 17 and a reed valve device L is mounted on the head cover 17. The main frame m of the frame F of the motorcycle, extending just above the engine E, is concave to follow the convex profile of the upper end of the engine E, so that a uniform gap G of a substantially constant width is formed between the lower face of the main frame m and the upper face of the internal combustion engine E in the longitudinal direction of the motorcycle. Therefore, even when the main frame m is positioned in close proximity to the upper face of the internal combustion engine E to reduce the overall height of the motorcycle, it is possible to remove the head cover 17 together with the reed valve device L mounted thereon, forwardly without substantial difficulty, as shown by the chain-dotted lines in FIG. 10. Thereby, the necessity for the demounting of the reed valve device L alone is eliminated and the chance of damaging the reed valve device L is reduced.

In addition, the valve housing 18 is directly attached to the head cover 17 without the intermediate insulator, so that the height of the valve housing 18 is reduced correspondingly and the level of the main frame m can be lowered.

It is, therefore, possible to position the main frame m of the frame F as close as possible to the engine E. It is, therefore, possible to mount the reed valve device L without incurring substantial increase of the height of the motorcycle and reduction of capacity of the fuel tank.

In addition, the easy demounting of the cylinder head cover 17 permits easier maintenance of the engine E such as adjustment of the tappet clearance. Other parts of the second embodiment are substantially identical to those of the first embodiment, and are designated by the same reference numerals in the Figures.

Although the embodiments of the invention have been described with specific reference to an internal combustion engine having two cylinders, it is of course possible to adapt the invention to engines having three or more cylinders.

What is claimed is:

1. In a motorcycle having a frame with a longitudinal axis and on which are mounted a fuel tank and a seat; front and rear wheels suspended from said frame and a multi-cylinder internal combustion engine disposed in a space defined by said fuel tank, said seat and said wheels such that a crank shaft of said engine extends at right angles to the longitudinal axis of said frame, said engine including combustion chambers defined in respective cylinders, a plurality of exhaust ports open in the front of said engine and communicating with respective combustion chambers and exhaust means connected to respective exhaust ports;

an improvement comprising an exhaust gas cleaning system for said multi-cylinder internal combustion engine including:

reed valve means on said engine having inlet and outlet ports and operating in response to pulsating exhaust pressure in said engine;

an upstream secondary air passage connected to said inlet port of said reed valve means and adapted to communicate with the atmosphere to supply secondary air to said reed valve means;

and a plurality of downstream secondary air passages of substantially equal length connected between said outlet ports of said reed valve means and corresponding exhaust ports of said engine to supply secondary air to said exhaust ports, said engine further including a cylinder head and a head cover, said reed valve means including a valve housing mounted on said head cover and defining a valve chamber therewith, and a reed valve in said valve housing dividing said valve chamber into an upstream and a downstream chamber which are connected respectively, to said upstream secondary air passage and said downstream secondary air passages.

2. An exhaust gas cleaning system as claimed in claim 1, wherein said reed valve means is disposed centrally, widthwise, on said head cover.

3. An exhaust gas cleaning system as claimed in claim 2 wherein said head cover has front and rear surfaces, said downstream secondary air passages extending along the front surface of said head cover to be cooled during forward travel of the motorcycle.

4. An exhaust gas cleaning system as claimed in claim 1 wherein said downstream secondary air passages are integral with said head cover.

5. An exhaust gas cleaning system as claimed in claim 4 wherein said head cover includes a space surrounding at least a part of said downstream secondary air passages and communicating with ambient air.

6. An exhaust gas cleaning system as claimed in claim 3,4 or 5 comprising cooling fins on said cover around said downstream secondary air passages.

7. An exhaust gas cleaning system as claimed in claim 1 comprising heat-resisting elastic packing means mounting said reed valve in said valve housing.

8. An exhaust gas cleaning system as claimed in claim 7 wherein said reed valve includes a plurality of reeds, one for each downstream secondary air passage.

9. An exhaust gas cleaning system as claimed in claim 8 comprising a partition dividing said space so that each reed controls flow of secondary air to its respective downstream secondary air passage, said partition extending towards said inlet port and tapering in thickness theretowards to divide the flow of incoming secondary air to the upstream chambers of the reeds.

10. An exhaust gas cleaning system as claimed in claim 1 wherein said valve chamber has an inlet port and a plurality of outlet ports corresponding to the downstream secondary air passages, each of said downstream secondary air passages including a first passage disposed in said head cover communicating with a respective outlet port of said valve chamber and a second passage disposed in said cylinder head and communicating with the associated exhaust port, and connecting means connecting said first and second passages in series in airtight manner.

11. An exhaust gas cleaning system as claimed in claim 10 wherein said connecting means includes a connecting member comprising a first end portion fitted into said downstream secondary air passage in said cylinder head in airtight manner and a second end portion fitted in airtight manner in said downstream secondary air passage in said head cover, one of said end portions being of larger diameter than the other.

12. An exhaust gas cleaning system as claimed in claim 11 wherein said connecting member includes a cylindrical body made of a material having relatively low heat conductivity, said cylindrical body having an inner peripheral surface and a heat-resistant metallic material on said inner peripheral surface.

13. An exhaust gas cleaning system as claimed in claim 11 wherein said one end portion of larger diameter of said connecting member is secured in its respective member and the other end of smaller diameter is sealably and slidably inserted into its respective member.

14. An exhaust gas cleaning system as claimed in claim 13 wherein each connecting member interconnects said first and second passages of the respective downstream secondary air passage, the connecting members of the plurality of downstream secondary air passages constituting a guide means for assembly of said head cover and cylinder head.

15. An exhaust gas cleaning system as claimed in claim 1 wherein each said downstream secondary air passage has a substantially constant cross-sectional area over the entire length thereof, said system further comprising a connecting pipe having an orifice connecting said inlet port of said reed valve means to said upstream secondary air passage.

16. A secondary air supply system of an exhaust gas cleaning system for an engine including a body having a plurality of cylinders and exhaust pipes connected to said cylinders, said secondary air supply system comprising secondary air supply passage means for supplying said exhaust pipes with secondary air and valve means disposed in an intermediate portion of said secondary air supply passage means for being opened and closed in response to pulsating exhaust pressure generated in said exhaust pipes, said secondary air supply passage means having an inlet end adapted for communication with the ambient atmosphere and an outlet end connected to said exhaust pipes, said valve means including a plurality of independent valve chambers corresponding to respective cylinders, a single valve housing having a secondary air inlet port through which secondary air is distributed to said valve chambers, said valve housing having an open lower face which is attached to said engine body, an insulator interposed between said lower face of said valve housing and said engine body, said valve housing and engine body cooperating to form said valve chamber, and a plurality of reed valves dividing each valve chamber into a upstream chamber and a downstream chamber, said upstream chambers being connected by said secondary air inlet port with the inlet end of said secondary air passage means, each of said downstream chambers being in communication with the outlet end of said secondary air passage means.

17. A secondary air supplying system as claimed in claim 16 wherein said insulator is a heat-resistant shock-absorbing material.

18. In a motorcycle having a frame suspending an internal combustion engine as a driving power source, said engine including a cylinder and cylinder head cover, said engine having an exhaust system, said frame having a head pipe and a main frame extending rearwardly from the head pipe immediately above said engine, and an exhaust gas cleaning system including a secondary air supply system connected to said exhaust system, and reed valve means interposed at an intermediate portion of said secondary air supply system for being opened and closed during engine operation to supply said exhaust system with secondary air to oxidize and remove unburnt components in said exhaust system, the improvement wherein said reed valve means is mounted on the head cover of said engine to constitute the upper profile of the engine, said main frame being shaped in correspondence with said upper profile to form a gap therewith of substantially uniform height.

19. A motorcycle as claimed in claim 18 wherein said head cover is removably attached to said cylinder, said gap being of a height to enable removal of said head cover and the reed valve means thereon as a unit from said cylinder.

* * * * *